United States Patent [19]

Brown

[11] Patent Number: 4,574,272

[45] Date of Patent: Mar. 4, 1986

[54] TONE RINGER FOR TELEPHONE SETS AND OTHER TELECOMMUNICATIONS APPARATUS

[75] Inventor: Michael Brown, Nepean, Canada

[73] Assignee: Northern Telecom Limited, Montreal, Canada

[21] Appl. No.: 434,117

[22] Filed: Oct. 13, 1982

[51] Int. Cl.4 .......................... G08B 3/00; H01L 41/04
[52] U.S. Cl. .............................. 340/384 R; 340/384 E; 310/322; 179/110 A
[58] Field of Search ................. 340/384 R, 384 E; 179/84 T, 84 R, 110 A; 340/388, 391; 310/322, 324

[56] References Cited

U.S. PATENT DOCUMENTS

| | | | |
|---|---|---|---|
| 3,798,383 | 3/1974 | Brandstäter | 179/84 R |
| 4,214,131 | 7/1980 | Bush et al. | 179/84 T |
| 4,284,857 | 8/1981 | Slavin et al. | 340/391 |
| 4,330,729 | 5/1982 | Byrne | 179/110 A |
| 4,374,377 | 2/1983 | Saito et al. | 340/384 E |
| 4,429,247 | 1/1984 | Feldman | 179/110 A |

*Primary Examiner*—John W. Caldwell, Sr.
*Assistant Examiner*—Tyrone Queen
*Attorney, Agent, or Firm*—Sidney T. Jelly

[57] ABSTRACT

The vibratory element of a tone ringer, as used for a telephone set for example, is gripped at its periphery between a ledge on a base housing and a thin deformable extension on a top housing. Interengaging clamping members and wedging members force the top housing down on the base housing when the top housing is rotated relative to the bottom housing. This forces the thin deformable extension into a tight gripping contact with the vibratory element clamping it against the ledge while the thin portion deforms. A ratchet arrangement can be provided to rotationally lock the top housing relative to the base housing. A mounting position for a printed circuit board can be provided on the base housing.

6 Claims, 4 Drawing Figures

TONE RINGER FOR TELEPHONE SETS AND OTHER TELECOMMUNICATIONS APPARATUS

This invention relates to tone ringers, as used in telephone sets and other telecommunications apparatus.

Tone ringers are non-mechanical buzzers, their sound output or "ring" eminating from a flat element which vibrates when subjected to an electrical current.

For the generation of the best sound output it is required that the element operates in a cavity which is air tight on one side of the element. Also it is important that the element be gripped firmly at its circumference, enabling it to vibrate evenly from the center.

A conventional form of tone ringer comprises two holding members which snap together, the vibrating element held between the two housing members. It has been found that snap type assemblies do not always produce acceptable air seals without the addition of a plastic sealant. Also, snap assembly does not maintain a uniform gripping pressure at the periphery of the element. Thus the requirements of an air tight cavity on one side of the element and even vibration of the element are very frequently not met.

The present invention provides a tone ringer in which an air tight seal is provided and firm gripping of the element is obtained, simply and easily, without a requirement for very close manufacturing tolerances.

A tone ringer, in accordance with the present invention, comprises a base housing member having a peripherally extending ledge, a vibratory element resting on the ledge and spaced from the bottom of the base housing member to form a bottom cavity, and a top housing member or cap fitting on the base housing member to form a top cavity, the top housing member having a thin deformable edge extending down into contact with the periphery of the element. Inclined clamping members cooperate with inclined clamping surfaces, on the top housing member and base housing member. Rotation of the top housing member relative to the base housing member wedges or forces the top housing member down on the base housing member, forcing the thin deformable edge into firm contact with the element, deforming the edge and providing an air tight seal and a firm gripping of the periphery of the element. A ratchet arrangement can be provided for rotational locking of the top housing member. Apertures in the bottom of the base housing member provide for issuance of the sound from the vibrating element, and a shutter may be provided for partially or completely closing the apertures to provide volume control of the sound emission.

The invention will be readily understood by the following description of an embodiment, by way of example, in conjunction with the accompanying drawings, in which.

Figure 1:
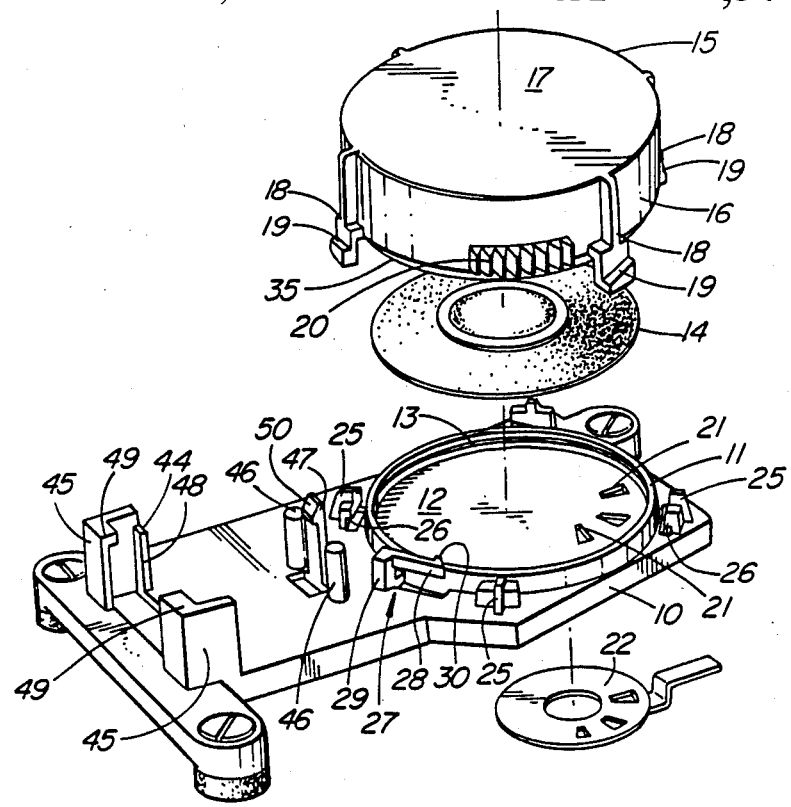
FIG. 1 is an exploded perspective view of a tone ringer.

As illustrated in FIG. 1, a tone ringer comprises a base 10 at one end of which is an upwardly extending circular rim 11. This forms a base housing member, having a bottom surface 12. Part way up the rim 11 is a ledge 13. Ledge 13 is seen more clearly in FIGS. 3 and 4. Fitting in the base housing member is a circular vibratory element 14. The element sits on the ledge 13. A top housing member 15 has a downwardly rim 16 and a top surface or web 17. At the lower edge of the rim 16 are formed a plurality of clamping members 18 extending down from the bottom edge of the rim 16, and also spaced outward from the rim. The members 18 have inclined upwardly facing surfaces 19. At some convenient position on the outer periphery of the rim 16, adjacent to the bottom edge thereof, is a ratchet formation 20. One or more apertures 21 in the bottom surface 12 allow the sound to issue and the volume of the sound can be varied by a rotatable shutter 22.

Figure 2:
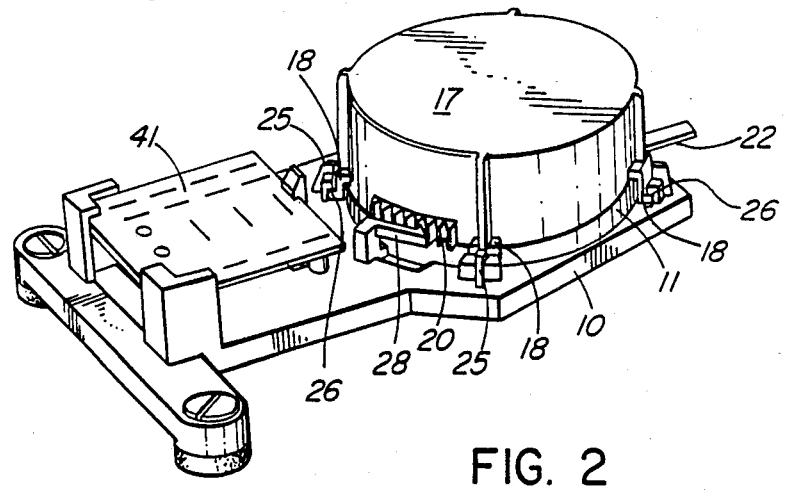
FIG. 2 is a perspective view of an assembled tone ringer as in FIG. 1.
Figure 3:
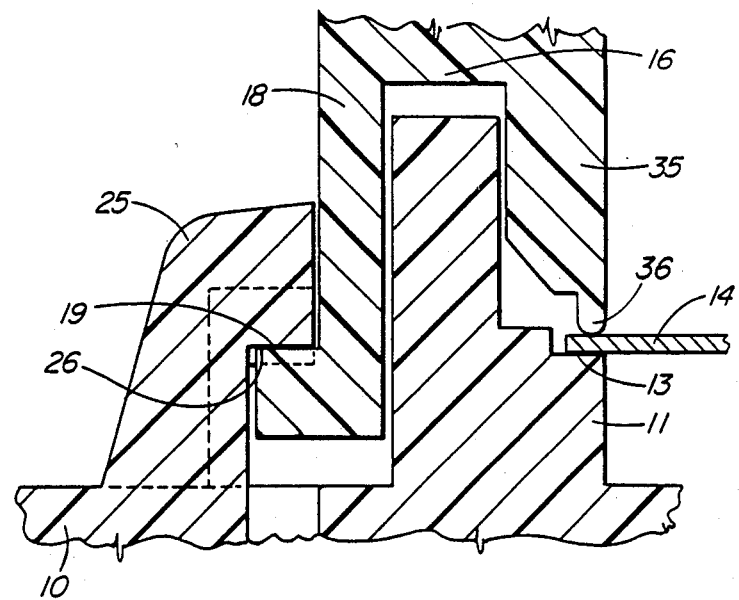
FIG. 3 is a cross-section on the line III—III of FIG. 2 illustrating initial assembly of the top housing member to the base housing member.
Figure 4:
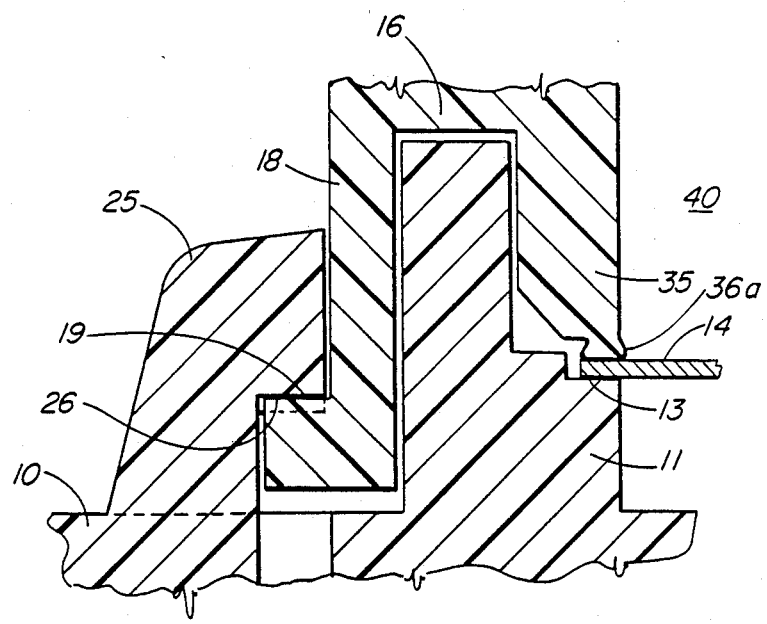
FIG. 4 is a cross-section similar to FIG. 3, illustrating the condition after full assembly of top and base housing members.

On the base 10, spaced around the rim 11, and also spaced radially from the rim a short distance, are a plurality of wedging members 25, a wedging member for each clamping member 18. Each wedging member 25 has a downwardly facing inclined surface 26 which cooperates with the related inclined upwardly facing surface 19 on a clamping member 18. The cooperation of the clamping and wedging members is illustrated in FIGS. 3 and 4. Also positioned on the base 10 adjacent to the rim 16 is a ratchet member 27. Ratchet member 27 is in the form of a resilient arm 28 extending sideways from a bracket 29 extending up from the base 10. The arm 28 has an inwardly extending rib 30 at its outer end and with the top housing member in position on the base housing member, the rib engages in the ratchet formation 20 on the top housing member. This is seen in FIG. 2.

To assemble the tone ringer, the element 14 is put into the base housing member, the periphery of the element 14 resting on the ledge 13. The top housing member is then placed on the base housing member. The rim 16 of the top housing member 15, has a thin portion extending downward. This portion is partially seen at 35 in FIG. 1, and also in FIGS. 3 and 4. The portion 35 fits inside the upper portion of the rim 11 of the base housing member, resting on the element 14. The top housing member is then rotated, relative to the base 10, in a clockwise direction as seen in FIG. 1. The clamping members 18 engage with the wedging members 25, the upward facing inclined surfaces 19 engaging under the downwardly facing inclined surfaces 26. Continued rotation of the top housing member forces the portion 35 down into the bottom housing member, into deforming contact with the element 14. The ratchet member arm 28 deflects, passing over the ratchet formation 20. The top housing member can be rotated to a predetermined torque and is locked in the position by engagement of the rib 30 with the ratchet formation 20. The assembled tone ringer is then as illustrated in FIG. 2.

FIGS. 3 and 4 illustrate the initial and final stages of the assembly of the top housing member to the base housing member. In FIG. 3 the top housing member 15 has been positioned over the rim 11 of the base housing member. The vibratory element 14 rests at its periphery on ledge 13 in rim 11. The downward projecting portion 35 of the rim 16 is resting on the periphery of the element 14, and the top housing member has been rotated to engage the wedging members 25 and clamping members 18. The surfaces 26 and 19 of the wedging and clamping members respectively are in contact. The downward extending portion 35 is formed with a thin edge 36 extending downward, the edge preferably having a radialised end surface.

In FIG. 4 the top housing member has been rotated, as a result of which it has been forced down by the inter-reaction of the surfaces 19 and 26. This causes the edge 36 to deform, as shown at 36a, in FIG. 4. This deformation of the edge 35 provides an extremely high gripping or clamping pressure on the peripheral edge of the vibratory element. This creates not only the desired air seal for an air tight upper cavity, indicated at 40, but also gives the desired optimum vibrating performance. Once this desired deformation and pressure is attained, the ratchet member 27 and ratchet formation 20 ensure that the top housing member does not loosen.

The desired clamping pressure of the top and base housing members is obtained by the application of a pre-determined torque to the top housing member. The need for close tolerances is avoided and an increase in the percentage of successfully operating ringers is obtained.

Referring further to FIGS. 1 and 2, the particular base 10 illustrated includes a mounting position for a printed circuit board (PCB). The mounting position is defined at one end by two opposed corner brackets 45, and at another end by two pillars 46 extending upward and a snap-in retaining member 47. Each corner bracket 45 has a short rib 48 extending inward, the top edges 44 of the ribs providing a seating for one end of the PCB. The PCB rests at its other end on the pillars 46. Each corner bracket also has an inwardly extending flange 49 on a top edge, the flanges extending in a direction towards the pillars 46. A PCB is mounted on the base by sliding one end under the flanges 49, and pushing the other end down. The retaining member 47 is deflected by the PCB sliding down the inclined surface 50, the retaining member then snapping and overlapping the other end of the PCB. The PCB is then held in position by the corner brackets 45 with flanges 49 and by the retaining member 47. The PCB rests on the top surfaces of the ribs 48 and the pillars 46.

The base housing member used need not be part of a member also supporting other items, but may be shaped and dimensioned only to accept the top housing member. It is possible to reverse the positions of clamping members 18 and wedging members 25. That is the wedging members 25 could be formed on the top housing and the clamping members on the base housing member. Also it is possible that only one of each opposed pair of wedging and clamping members have an inclined surface.

What is claimed is:

1. A tone ringer comprising:
   a base member having a bottom surface and a peripherally extending ledge spaced from said bottom surface;
   a circular vibratory element resting at its periphery on said ledge;
   a top housing having a top surface and a downwardly extending rim;
   said rim having an axially extending portion extending downwardly at the inner periphery of the rim, said axially extending portion including a downwardly extending rib, said rib resting on the periphery of said vibratory element;
   a plurality of clamping members positioned around said top housing and extending down from the bottom edge of said rim; a plurality of wedging members extending upward from said base housing, a wedging member aligned with each clamping member; an upwardly facing surface on each clamping member and a downwardly facing surface on each wedging member, at least one of the plurality of upward facing surfaces and the plurality of downward facing surfaces being inclined;
   each one of said upwardly facing surface adapted to engage under a respective one of said downwardly facing surfaces, relative rotation of top housing and base housing member engaging said upwardly facing surfaces and said downwardly facing surfaces and forcing said to housing down and deforming said rib to claim said vibratory element on to said ledge.

2. A tone ringer as claimed in claim 1 including a ratchet formation on the outer periphery of said rim and a resilient arm mounted on said base member, said arm including an inwardly extending rib in engagement with said ratchet formation for rotational locking of said top housing relative to said base housing member.

3. A tone ringer as claimed in claim 1 including at least one aperture in said bottom surface and means for varying the opening of said aperture.

4. A tone ringer as claimed in claim 3, said means for varying the opening of said aperture comprising a rotatable shutter.

5. A tone ringer as claimed in claim 1, said base housing member including mounting means for positioning and mounting a printed circuit board on said base housing member.

6. A tone ringer as claimed in claim 5, said mounting means comprising; two spaced opposed corner brackets for positioning one end of said printed circuit board, each of said corner brackets including a seating spaced from the top of the bracket and a rib extending laterally from the top of each bracket towards said seating; two pillars spaced from said corner brackets for positioning the other end of said printed circuit board; and a resilient member between said pillars, said resilient member having a rib at a top edge extending in a direction towards said corner brackets, a printed circuit board resting at one end on said seatings, the corners of the printed circuit board at said one end positioned in said corner brackets, said ribs extending from the top of each corner bracket extending over the end of the circuit board, the printed circuit board resting at its other end on said pillars and retained in position by said resilient member, said rib at the top edge of said resilient member extending over the other end of said printed circuit board.

* * * * *